United States Patent
Shimizu (10) Patent No.: US 8,309,238 B2
(45) Date of Patent: Nov. 13, 2012

(54) MAGNETIC RECORDING MEDIUM AND MAGNETIC RECORDING AND REPRODUCING DEVICE

(75) Inventor: Kenji Shimizu, Chiba (JP)

(73) Assignee: Showa Denko K.K., Tokyo (JP)

( * ) Notice: Subject to any disclaimer, the term of this patent is extended or adjusted under 35 U.S.C. 154(b) by 43 days.

(21) Appl. No.: 12/063,739

(22) PCT Filed: Dec. 22, 2006

(86) PCT No.: PCT/JP2006/326305
§ 371 (c)(1),
(2), (4) Date: Feb. 13, 2008

(87) PCT Pub. No.: WO2007/074913
PCT Pub. Date: Jul. 5, 2007

(65) Prior Publication Data
US 2009/0035606 A1    Feb. 5, 2009

Related U.S. Application Data

(60) Provisional application No. 60/755,088, filed on Jan. 3, 2006.

(30) Foreign Application Priority Data

Dec. 26, 2005   (JP) ................. 2005-372064

(51) Int. Cl.
*G11B 5/66* (2006.01)
(52) U.S. Cl. ..................................... 428/829
(58) Field of Classification Search ........ 428/800–848.9
See application file for complete search history.

(56) References Cited

U.S. PATENT DOCUMENTS

| | | | | |
|---|---|---|---|---|
| 5,057,380 | A * | 10/1991 | Hayashi et al. | 428/829 |
| 2003/0219628 | A1* | 11/2003 | Meguro et al. | 428/694 R |
| 2004/0027868 | A1* | 2/2004 | Nakamura et al. | 365/199 |
| 2004/0137278 | A1* | 7/2004 | Uwazumi et al. | 428/694 TM |
| 2005/0019608 | A1* | 1/2005 | Kim et al. | 428/694 BS |
| 2005/0227120 | A1 | 10/2005 | Ichihara et al. | |

(Continued)

FOREIGN PATENT DOCUMENTS

EP    1 061 511 A2    12/2000

(Continued)

OTHER PUBLICATIONS

Ha et al. ("Soft magnetic properties of CoFeAlN thin films", Journal of Magnetism and Magnetic Materials 290-291 (2005) (Online published Dec. 2004) 1469-1471).*

(Continued)

*Primary Examiner* — Holly Rickman
*Assistant Examiner* — Linda Chau
(74) *Attorney, Agent, or Firm* — Sughrue Mion, PLLC (57) ABSTRACT

The present invention has its object to offer magnetic recording medium and magnetic recording and reproducing device that can record and reproduce high density data by optimizing the soft magnetic layer material forming the soft magnetic underlayer and the under layer material. In the present invention, the perpendicular magnetic recording medium A has at least the soft magnetic underlayer a, the under layer 5, the intermediate layer 6 and the perpendicular magnetic recording layer on the non-magnetic substrate 1. The soft magnetic layers 2, 4 that form the soft magnetic underlayer a, has an amorphous structure and is made of CoAl alloy or CoFeAl alloy having saturation magnetic flux density Bs greater than 1.1 T.

16 Claims, 2 Drawing Sheets

U.S. PATENT DOCUMENTS

| | | |
|---|---|---|
| 2005/0238929 A1 | 10/2005 | Uwazumi et al. |
| 2005/0244679 A1* | 11/2005 | Arai et al. ............... 428/828 |
| 2005/0255336 A1 | 11/2005 | Mukai |
| 2005/0255337 A1* | 11/2005 | Mukai ............... 428/831 |

FOREIGN PATENT DOCUMENTS

| | | | |
|---|---|---|---|
| JP | 63124213 A | * | 5/1988 |
| JP | 2669529 B2 | | 10/1989 |
| JP | 01-287820 A | | 11/1989 |
| JP | 05304014 A | * | 11/1993 |
| JP | 06-282834 A | | 10/1994 |
| JP | 11-149628 A | | 6/1999 |
| JP | 2001-14631 A | | 1/2001 |
| JP | 2003-123239 A | | 4/2003 |
| JP | 2005-302150 A | | 10/2005 |
| JP | 2005-310356 A | | 11/2005 |
| JP | 2005-327430 A | | 11/2005 |
| JP | 2005-353256 A | | 12/2005 |
| WO | 2005/093719 A1 | | 10/2005 |

OTHER PUBLICATIONS

Jian-Wang Cai et al. The effects of buffer layers on the crystalline structures and magnetic properties of Co-rich Co—Fe and Co—Fe—Al films. (1995), J. Phys. D: Appl. Phys. 28 p. 1778-1784.*

* cited by examiner

MAGNETIC RECORDING MEDIUM AND MAGNETIC RECORDING AND REPRODUCING DEVICE

CROSS REFERENCE TO RELATED APPLICATIONS

This application claims the benefit of U.S. Provisional Application 60/755,088 filed on Jan. 3, 2006. Priority is claimed based on Japanese Patent Application 2005-372064, filed Dec. 26, 2005.

TECHNICAL FIELD

The present invention relates to magnetic recording medium and magnetic recording and reproducing device using this magnetic recording medium.

BACKGROUND ART

By directing the easy axis of magnetization of the magnetic recording layer that was conventionally directed in the in-plane direction of the medium, the demagnetizing field near the magnetic transition region, which is the boundary between recording bits, becomes smaller. As a result, the static magnetism stabilizes with the increase in recording density, and the resistance to thermal fluctuation improves, therefore, the perpendicular magnetic recording system is a suitable system for enhancing surface recording density.

When a soft magnetic underlayer made of soft magnetic material is provided between the substrate and the perpendicular magnetic recording layer, it works as the so-called vertical two-layer medium, and high recording performance can be obtained. In this condition, the soft magnetic underlayer has the role of refluxing the recording magnetic field from the magnetic head, and thus enhancing the recording and reproducing efficiency.

Amorphous materials such as CoZrNb, CoTaZr, and FeCoB are generally proposed as soft magnetic material for forming the soft magnetic underlayer mentioned above. For instance, CoZr alloy (refer to Patent Document 1) or FeAlSi, FeTaN (refer to Patent Document 2) may be used. Various kinds of materials have been proposed for the under layer to be provided on the soft magnetic underlayer mentioned above. For instance, hcp structures such as Ti alloy (refer to Patent Document 3) and NiFeCr (refer to Patent Document 4) or amorphous structures such as Ta may be used.

If CoZrNb or CoTaZr is used as the soft magnetic underlayer mentioned above, the problem of corrosion of Co or Fe at high temperature and high humidity occurs in CoFe alloys in both kinds of materials. It has been observed that in CoFe alloy with Fe added thereto to increase the saturation magnetic flux density (Bs), this problem is more noticeable.

If a material with no magnetism in the under layer is used, the distance of the head and soft magnetic underlayer surface increases further from the thickness of the under layer, and the soft magnetic underlayer has to be increased in thickness to enable adequate writes. By using material with soft magnetic characteristics in the under layer, both the role of the soft magnetic underlayer and the crystal orientation of the intermediate layers provided above can be controlled. However, it has been observed that when Ni, Ni alloy, NiFe alloy or NiCo alloy materials are used in the under layer, the crystal orientation changes significantly depending on the soft magnetic underlayer material.

Patent Document 1: Japanese Unexamined Patent Application, First Publication No. H6-282834.

Patent Document 2: Japanese Unexamined Patent Application, First Publication No. H11-149628.

Patent Document 3: Japanese Patent Publication No. 2669529.

Patent Document 4: Japanese Unexamined Patent Application, First Publication No. 2003-123239.

DISCLOSURE OF INVENTION

The configuration of media proposed in the past was inadequate to attain magnetic recording media with excellent recording and reproduction characteristics, and good productivity. Means to resolve this problem and magnetic recording medium that could be manufactured easily have been demanded since the past.

The present invention has its object to offer magnetic recording medium and magnetic recording and reproducing device that can record and reproduce high density data by optimizing the soft magnetic layer material forming the soft magnetic underlayer and the under layer material after considering the circumstances mentioned above.

The present invention adopts the configuration described below to achieve the object mentioned above.

(1) The magnetic recording medium of the present invention comprises a perpendicular magnetic recording medium formed by at least an soft magnetic underlayer, a under layer, an intermediate layer, and a perpendicular magnetic recording layer on a non-magnetic substrate, wherein the soft magnetic underlayer includes soft magnetic layer which has an amorphous structure an is made of CoAl alloy having saturation magnetic flux density Bs greater than 1.1 T.

(2) The magnetic recording medium of the present invention comprises a perpendicular magnetic recording medium formed by at least an soft magnetic underlayer, a under layer, an intermediate layer, and a perpendicular magnetic recording layer on the non-magnetic substrate, wherein the soft magnetic underlayer is formed by soft magnetic layer with an amorphous structure made of CoFeAl alloy having saturation magnetic flux density Bs greater than 1.4 T.

(3) The magnetic recording medium of the present invention has Al content of the soft magnetic layer that is greater than 0.2 at. % but less than 7 at. %.

(4) The magnetic recording medium of the present invention has Al content of the soft magnetic layer that is greater than 0.3 at. % but less than 3 at. %.

(5) The magnetic recording medium of the present invention has Fe content of the soft magnetic layer that is less than 50 at. %.

(6) The magnetic recording medium of the present invention has also at least one of Ta, Nb or Zr as content in the soft magnetic layer.

(7) The magnetic recording medium of the present invention has also either Ni or Cr included as content in the soft magnetic layer.

(8) The magnetic recording medium of the present invention has the soft magnetic underlayer comprising two layers of AFC (Anti-Ferro-Coupling) structure and Ru film formed between these two layers of soft magnetic layer.

(9) The magnetic recording medium of the present invention wherein Ms·T (T·nm), the product of the saturation magnetic flux density and film thickness of the soft magnetic underlayer is greater than 3 but less than 8.

(10) The magnetic recording medium of the present invention wherein the under layer material is either Ni, Ni alloy, NiFe alloy or NiCo alloy, and the Δθ50 of the Ru alloy provided thereupon is less than 6 degrees.

(11) The magnetic recording medium of the present invention wherein the intermediate layer is made of either Ru or Ru alloy.

(12) The magnetic recording medium of the present invention wherein the film thickness of the soft magnetic underlayer is greater than 20 nm but less than 80 nm.

(13) The magnetic recording medium of the present invention wherein the thickness of the intermediate layer is less than 16 nm.

(14) The magnetic recording medium of the present invention wherein the soft magnetic layer is either CoFeAlZrNb, CoFeAlHfNb, CoFeAlTaNb, CoFeAlZrNbCr, or CoFeAlZrNbNi.

(15) The magnetic recording medium of the present invention further has a barrier layer between the non-magnetic substrate and the soft magnetic underlayer.

(16) The magnetic recording medium of the present invention wherein the barrier layer has a main element selected from the elements included by the soft magnetic underlayer except for Co and Fe.

(17) The magnetic recording medium of the present invention wherein the barrier layer has an amorphous structure.

(18) The magnetic recording medium of the present invention wherein the film thickness of the barrier layer is greater than 1 nm but less than 20 nm.

(19) The magnetic recording and reproducing device of the present invention comprises magnetic recording medium and magnetic head for recording and reproducing information on the magnetic recording medium, wherein the magnetic head is a single magnetic pole head, and the magnetic recording medium is the magnetic recording medium according to any of (1) to (18).

As mentioned above, according to the present invention, the perpendicular magnetic recording medium comprises at least an soft magnetic underlayer and under layer and intermediate layer and perpendicular magnetic recording layer on non-magnetic substrate, wherein the soft magnetic underlayer formed by soft magnetic layer with saturation magnetic flux density Bs greater than 1.1 T is made of CoAl alloy, and the under layer is formed either by Ni, Ni alloy, NiFe alloy, or NiCo alloy. Therefore, magnetic recording medium and magnetic recording and reproducing device capable of recording and reproducing high density information with excellent productivity can be offered.

EXPLANATION OF REFERENCE NUMERALS

A: Magnetic recording medium; a: soft magnetic underlayer; 1: non-magnetic substrate; 2: first soft magnetic layer; 3: non-magnetic intermediate layer; 4: second soft magnetic layer; 5: under layer; 6: intermediate layer; 7: perpendicular magnetic recording layer; 8: protective layer; 9: lubricating layer; 10: magnetic recording medium; 12: magnetic recording and reproducing device; 13: spindle motor; 14: magnetic head; 15: head actuator; 16: recording-reproducing signal processing system.

BEST MODE FOR CARRYING OUT THE INVENTION

Figure 1:
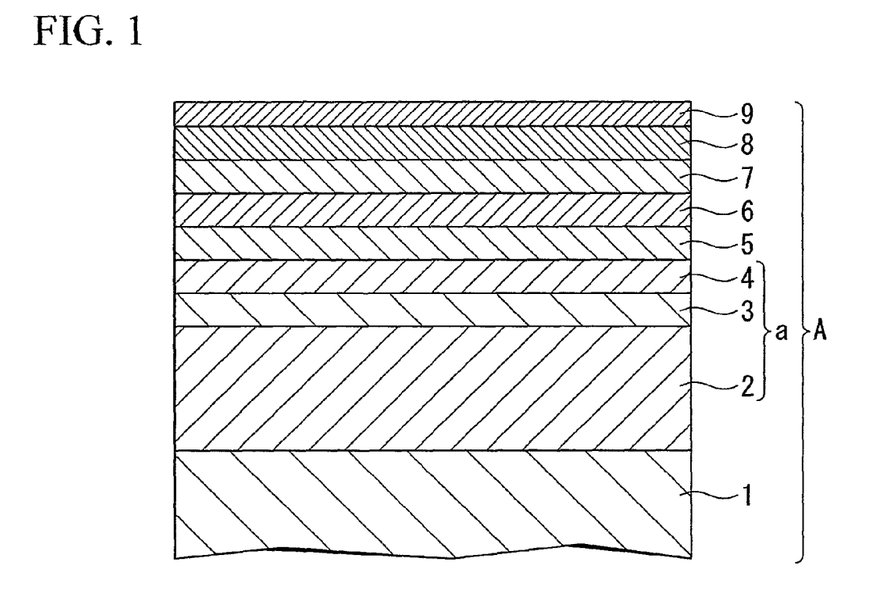
FIG. 1 is a cross section view showing the first example of the magnetic recording medium related to the present invention.

FIG. 1 shows an example of the first example of the magnetic recording medium of the present invention.

The magnetic recording medium A shown here comprises a first soft magnetic layer 2, a non-magnetic intermediate layer 3 made of Ru, and a second soft magnetic layer 4, which together form the soft magnetic underlayer a on a non-magnetic substrate 1, whereupon a under layer 5, an intermediate layer 6, a perpendicular magnetic recording layer 7, a protective layer 8, and a lubricating layer 9 are sequentially formed.

A metallic substrate made of metallic material such as aluminum or aluminum alloy may be used as the non-magnetic substrate 1, or a non-metallic substrate made of non-metallic material such as glass, ceramic, silicon, silicon carbide or carbon may be used.

The glass substrate used in the present example may be amorphous glass and crystalline glass. General purpose soda lime glass or aluminum silicate glass may be used as the amorphous glass. Lithium-based crystalline glass may be used as the crystalline glass.

By using an average surface roughness Ra below 0.8 nm, more preferably below 0.5 nm in the non-magnetic substrate 1, the intermediate layer and the crystal orientation of the perpendicular magnetic recording layer can be enhanced, as a result of which the recording and reproducing characteristics are enhanced. Moreover, the low flying of the head preferable for high recording density media is a favorable feature. Also, a micro-waviness of the surface (Wa) of below 0.3 nm (preferably below 0.25 nm) is preferable for the low flying of the magnetic head for recording with high recording density, and is a favorable feature.

The soft magnetic underlayer comprises 2 soft magnetic layers and Ru formed between the 2 soft magnetic layers. The soft magnetic layer above and below the Ru are AFC-coupled.

The soft magnetic layer 2, 4 should preferably be made of CoAl alloy, more preferably of CoFeAl alloy. The saturation magnetic flux density Bs should be greater than 1.1 T, and preferably greater than 1.4 T. By using these materials, high saturation magnetic flux density and high resistance to corrosion can be obtained. Also, when Ni, Ni alloy, NiFe ally or CoNi alloy is used in the under layer 5, excellent recording and reproducing characteristics can be obtained.

By adding Al to the soft magnetic layer 2, both recording and reproducing characteristics, and resistance to corrosion can be improved significantly. The amount of Al added should be greater than 0.2 at. % but less than 7 at. % (preferably greater than 0.3 at. % but less than 5 at. %). If the amount of Al added is less than 0.2 at. %, the corrosion of Co or Fe cannot be inhibited adequately, so this amount is not preferred. If the amount of Al exceeds 7 at. %, the recording and reproducing characteristics deteriorate; so this amount is not preferred. More than one of Ta, Nb or Zr should preferably be added in CoAl or CoFeAl in the soft magnetic layer 2, 4. By adding these elements, the amorphization of soft magnetic layer 2, 4 is promoted, and the resistance to corrosion is enhanced. With the addition of these elements to soft magnetic layer 4, the crystal orientation properties of the under layer 5 and the intermediate layer 6 are enhanced; so the addition of these elements is preferred.

The amount of addition of Ta, Zr, Nb should preferably be greater than 5 at. % but less than 12 at. %. If the amount of addition of these elements is less than 5 at. %, and if a crystalline structure is used in the soft magnetic layer 2, 4, the crystal particle size of the under layer 5 increases, noise increases, and the corrosion resistance degrades; so such an amount is not preferred. Moreover, the total amount of Al, Ta, Nb added should preferably exceed 15 at. % (preferably less than 12 at. %) from the viewpoint of saturation magnetic flux density.

Ni and Cr are added to improve the corrosion resistance of the film; so the amount added should preferably be less than 5 at. %. With the increase in the amount added, the resistance to corrosion increases, but the saturation magnetic flux density decreases, so the increase is not preferred.

The Fe content in the soft magnetic layer 2, 4 should preferably be below 50 at. % (more preferably greater than 10 at. % but less than 40 at. %). If the Fe content exceeds 50 at. %, the resistance to corrosion degrades; so this content is not preferred.

The thickness of the soft magnetic underlayer should preferably be greater than 20 nm, but less than 80 nm. If the thickness of the soft magnetic underlayer a is less than 20 nm, the magnetic flux from the magnetic head cannot be absorbed adequately, writes become inadequate, and the recording and reproducing characteristics deteriorate; so this thickness is not preferred. If the thickness of the soft magnetic underlayer exceeds 80 nm, the productivity reduces considerably; so this thickness is not preferred.

When CoFeAlZrNb, CoFeAlHfNb, CoFeAlTaNb, CoFeAlZrNbCr or CoFeAlZrNbNi is used as the material of soft magnetic layer 2, 4, the orientation properties of the under layer 5 used as the predetermined material provided on top of it, are enhanced. Also, the thickness of the intermediate layer 6 can be reduced, and as a result, the thickness of the soft magnetic layer 2, 4 can be reduced. Accordingly, a good balance between recording and reproducing characteristics and productivity can be attained.

It is particularly preferable that the soft magnetic layer 2, 4 be an amorphous structure. By making it an amorphous structure, the increase in the surface roughness Ra can be prevented; the head flying amount can be reduced, moreover, high recording density can be attained. By using a crystalline structure, a grain boundary part is formed between crystals, which is a cause of corrosion; so this structure is not preferred.

Hbias, the index expressing the magnitude of the AFC-coupling of the soft magnetic layers 2, 4 of layer 2 that forms the soft magnetic underlayer a, should preferably be greater than 50 Oe.

Figure 2:
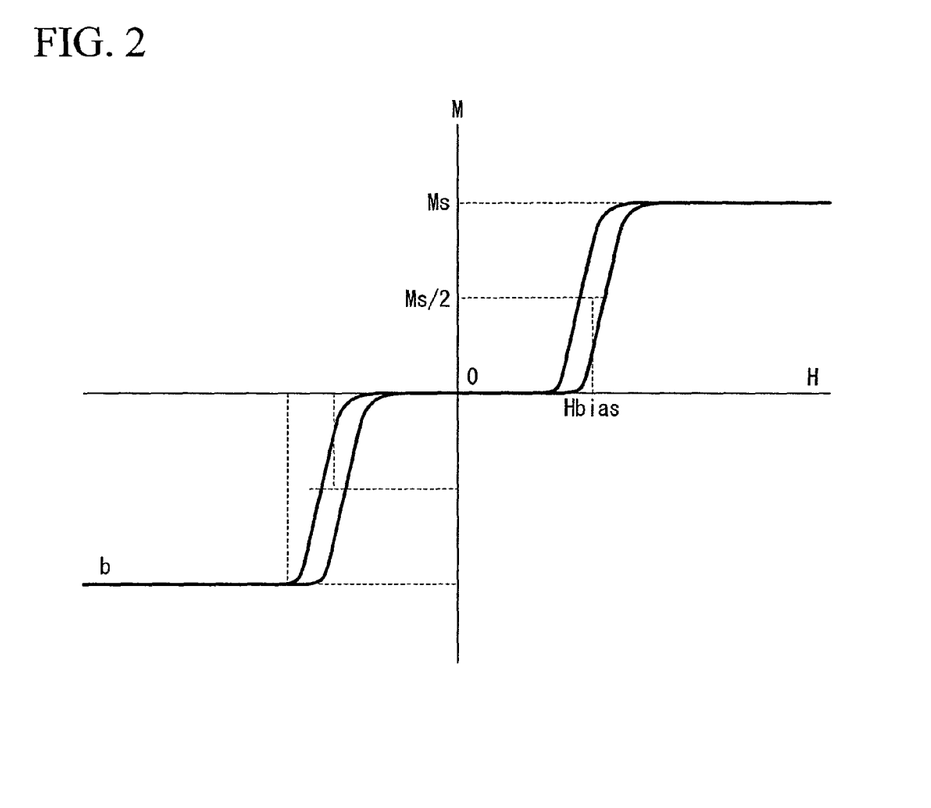
FIG. 2 shows the MH loop of the component in the substrate surface of the soft magnetic underlayer used in the magnetic recording medium related to the present invention.

Hbias is described referring to FIG. 2. FIG. 2 shows the MH loop of the components in the substrate surface of soft magnetic underlayer a (in the direction of easy axis of magnetization of soft magnetic layer 2, 4 forming the soft magnetic underlayer a). If the saturation magnetic flux density is taken as Ms, then Hbias is defined as the magnetic field of half the saturation magnetic flux density Ms, that is, Ms/2. Taking the above-mentioned material as soft magnetic layer 2, 4, if the thickness of the non-magnetic intermediate layer 3 of Ru provided between the soft magnetic layers 2, 4 of layer 2 is taken as the predetermined thickness (0.6 to 0.8 nm), then the soft magnetic underlayer a can be obtained. This enables the external magnetic field resistance and the WATE resistance to be increased.

The coercivity Hc of the soft magnetic layer 2, 4 should preferably be 10 Oe or less (more preferably be below 10 Oe). Note that 1 Oe is approximately 79 A/m.

For forming the soft magnetic layer 2, 4 with the configuration mentioned above, the sputtering method may be used, for instance. When forming the soft magnetic underlayer a, the film should preferably be formed with the magnetic field applied in the radial direction of the substrate. The under layer 5 is meant for controlling the orientation and crystal size of the perpendicular magnetic recording layer provided thereupon. The under layer 5 should preferably be made of Ni, Ni alloy, NiFe alloy or NiCo alloy.

Elements can be added to Ni, Ni alloy, NiFe alloy or NiCo alloy of the under layer 5 mentioned above with the objects of reducing the crystal size and increasing the consistency of size of crystal lattice with respect to the intermediate layer 6. B, Mn and so on may be used with the object of reducing the crystal size specifically, and the amount to be added should preferably be below 6 (at. %). Ru, Pt, W, Mo, Ta, Nb, Ti may be added with the object of increasing the consistency of crystal lattice size with respect to the intermediate layer 6.

The saturation magnetic flux density Bs of Ni, Ni alloy, NiFe alloy or NiCo alloy in the under layer 5 should be greater than 0.1 T, and preferably greater than 0.3 T. If less than 0.1 T, the role of a part of the soft magnetic underlayer may be weakened during writes, which degrades the recording and reproducing characteristics, and so is not preferred.

The thickness of the under layer 5 should preferably be greater than 1 nm but less than 10 nm. If the thickness of the under layer 5 is less than 1 nm, the effect of the under layer becomes inadequate, the effect of making the particle size finer cannot be obtained, and the orientation degrades; therefore, such values are not preferred. If the thickness of the under layer 5 exceeds 10 nm, the crystal size increases; therefore, such sizes are not preferred.

Non-magnetic intermediate layer 3 should preferably be made of Ru or Ru alloy.

The thickness of non-magnetic intermediate layer 3 should preferably be less than 16 nm (more preferably less than 12 nm). This becomes possible by using CoAl alloy or CoFeAl alloy in the soft magnetic layer 2, 4, and using predetermined materials in the under layer 5. By reducing the thickness of the non-magnetic intermediate layer 3, the distance between the magnetic head and the soft magnetic underlayer a can be reduced, and the magnetic flux from the magnetic head can be made steep. The result is that the thickness of the soft magnetic layer 2, 4 can be further reduced, and productivity can be enhanced.

The easy axis of magnetization in the perpendicular magnetic recording layer 7 is in a direction perpendicular to the substrate surface. The elements should include at least Co and Pt; furthermore, oxides or Cr, B, Cu, Ta, Zr may be added with the object of improving the SNR characteristics.

Oxides such as $SiO_2$, SiO, $Cr_2O_3$, CoO, $Ta_2O_3$, and $TiO_2$ may be used to form the perpendicular magnetic recording layer 7. The volume percentage of oxides should preferably be in the range of 15% to 40%. If the volume percentage of oxides is below 15%, the SNR characteristics become inadequate. This is not preferred. If the volume percentage of oxides exceeds 40%, only the coercivity required for high recording density cannot be obtained; therefore, such values are not preferred.

The new creation magnetic field (−Hn) of the perpendicular magnetic recording layer 7 should preferably be greater than 2.0 kOe. If −Hn is less than 2.0 kOe, thermal fluctuation occurs; this is not preferred.

The thickness of the perpendicular magnetic recording layer 7 should preferably be in the range of 6 to 20 nm. If the perpendicular magnetic recording layer 7 is a granular oxide layer, for instance, and if the thickness of the granular oxide layer is in this range, then adequate output can be ensured and degradation of OW characteristics does not occur. Therefore, a thickness in this range is preferred.

The perpendicular magnetic recording layer 7 may be a single-layered structure or it may be a multi-layered structure made of materials of different compositions. The structure should preferably be one that is stacked sequentially by layers containing oxides particularly and layers not containing oxides.

The protective layer 8 prevents corrosion of the perpendicular magnetic recording layer, and also prevents damage to the surface of the medium when the magnetic head touches the medium. Thus, the conventional, well-known materials can be used. For instance materials containing C, $SiO_2$, $ZrO_2$ may be used. The thickness of the protective layer should preferably be greater than 1 nm but less than 5 nm so that the distance between the magnetic head and the medium can be reduced from the viewpoint of high recording density.

Conventional well-known materials, such as for instance, perfluoropolyether, fluorinated alcohol, fluorinated carboxylic acid should preferably be used in the lubricating layer 9.

It is preferable that the magnetic recording medium of the present invention further includes a barrier layer between the non-magnetic substrate and the soft magnetic underlayer.

It is preferable that the barrier layer has a main element selected from the elements included by the soft magnetic underlayer except for Co and Fe. As a result, the corrosion which occurs because of an ingredient of a board or adsorbed water can be controlled by using such materials for the barrier layer.

It is preferable that the barrier layer is an amorphous structure. When the barrier layer is a crystal structure, the corrosion is started from a grain boundary. Corrosion resistance can be improved, because there is no part having an unstable point or a different density, by using the barrier layer with an amorphous structure.

The magnetic recording medium A of the present example is a perpendicular magnetic recording medium on the non-magnetic substrate 1 comprising of at least an soft magnetic underlayer a, under layer 5, intermediate layer 6, and perpendicular magnetic recording layer. The soft magnetic underlayer a is a CoAl alloy that comprises soft magnetic layer 2, 4 with saturation magnetic flux density Bs greater than 1.1 T, and the under layer may be made of either Ni, Ni alloy, NiFe alloy, or CoNi alloy. Thus, this magnetic recording medium enables recording and reproduction of high density information excellent for productivity.

Figure 3:
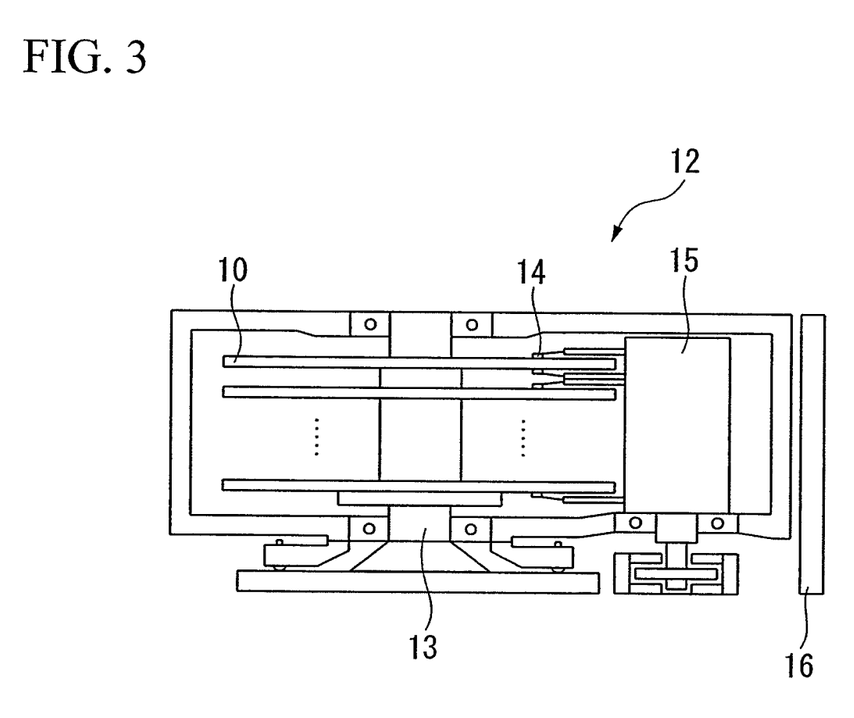
FIG. 3 is the configuration diagram showing an example of a magnetic recording and reproducing device provided with magnetic recording medium related to the present invention.

FIG. 3 shows an example of the magnetic recording and reproducing device using the magnetic recording medium mentioned above. The magnetic recording and reproducing device 12 shown here comprises a magnetic recording medium 10, a spindle motor 13 for rotatably driving the magnetic recording medium 10, a magnetic head 14 for recording and reproducing information on the magnetic recording medium 10, a head actuator 15, and a recording-reproducing signal processing system 16. The recording-reproducing signal processing system 16 can process the input data and send the recorded signals to the magnetic head 14, and can process the reproduced signals from the magnetic head 14 and output data.

EXAMPLES

The advantages of the present invention are described here by referring to examples. It is to be understood, however, that the present invention is not to be limited to these examples only.

Example 1

A glass substrate (amorphous substrate MEL3, diameter 2.5 inches made by MYG Co., Ltd.) was accommodated in a film formation chamber of a DC magneto-sputtering system (Model C3010 made by Anelva Co., Ltd.), and air in the film formation chamber was exhausted until the vacuum level reached $1 \times 10^{-5}$ Pa.

First soft magnetic layer made of 70Co-20Fe-2Al-4Zr-4Nb (Co content 70 at. %, Fe content 20 at. %, Al content 2 at. %, Zr content 4 at. %, Nb content 4 at. %) of thickness 30 nm, non-magnetic intermediate layer 3 made of Ru of thickness 0.6 nm, and second soft magnetic layer 4 made of 70Co-20Fe-2Al-4Zr-4Nb of thickness 30 nm were formed as the soft magnetic underlayer a. The crystalline structure of the first and second soft magnetic layers 2, 4 were verified as amorphous structure by XRD.

Next, the under layer 5 was made of Ni of thickness 5 nm, the intermediate layer 6 made of Ru of thickness 12 nm, the perpendicular magnetic recording layer 7 was made of 60Co-10Cr-20Pt-10SiO$_2$ of thickness 10 nm and 65Co-18Cr-14Pt-3B of thickness 6 nm.

Next, protective layer 8 was formed of thickness 4 nm by the CVD method.

By the dipping method, lubricating layer 9 was formed made of perfluoropolyether, and the perpendicular magnetic recording medium A was obtained.

Comparative Examples 1, 2

The magnetic recording media of comparative examples 1, 2 were prepared according to example 1 except for using 91Co-5Zr-4Nb or 71Co-20Fe-5Zr-4Nb as the material of the first soft magnetic layer and the second soft magnetic layer.

The static magnetic characteristics and the recording and reproducing characteristics were evaluated for the magnetic recording media of the example and the comparative examples. The Kerr effect measuring equipment manufactured by Neoarc Co., Ltd. Was used to evaluate the static magnetic characteristics, while Read-Write Analyzer RWA1632 and Spinstand S1701MP manufactured by GUZIK of USA were used to measure and evaluate the recording and reproducing characteristics.

For evaluating the recording and reproducing characteristics, the recording frequency conditions were measured taking the line recording density as 1000 kFCI, using the thin film magnetic head with TMR elements in the recording unit and single magnetic pole for writes. For evaluating overwrite (OW) characteristics, the first signal remaining after writing the 500 kFCI signal and then writing the 67 kFCI signal was measured. The corrosion test was performed using an optical microscope to observe several corrosion spots that were allowed to remain after 240 hours at high temperature and high humidity (80° C., 80%). The results of the evaluation above are shown in Table

TABLE 1

| | Soft Magnetic layer | | | Under layer | | Intermediate layer | | Static Magnetic Char. | Rec./Rep. Char. | | Corrosion Spots |
|---|---|---|---|---|---|---|---|---|---|---|---|
| | Comp. (at %) | Bs (T) | Thk. (nm) | Comp. (at %) | Thk. (nm) | Comp. (at %) | Thk. (nm) | Coercivity (Oe) | SNR (dB) | OW (dB) | (per surface) |
| Example 1 | 70Co—20Fe—2Al—4Zr—4Nb | 1.62 | 30 + 30 | 100Ni | 5 | 100Ru | 12 | 4720 | 24.8 | 35.8 | 0 |
| Comp. Example 1 | 91Co—5Zr—4Nb | 1.18 | 30 + 30 | 100Ni | 5 | 100Ru | 12 | 4520 | 23.6 | 24.9 | 13 |
| Comp. Example 2 | 71Co—20Fe—5Zr—4Nb | 1.68 | 30 + 30 | 100Ni | 5 | 100Ru | 12 | 4610 | 23.1 | 36.6 | 42 |

The example of Table 1 enabled comparison of the comparative examples 1, 2 and verified that the recording and reproducing characteristics are excellent. It was observed that excellent recording and reproducing characteristics could be obtained even when Ru of 12 nm smaller thickness was used in the intermediate layer 6. When materials with low Bs such as CoZrNb or CoTaZr were used, the overwrite (OW) characteristics degraded, suggesting that the film thickness was inadequate.

It was also verified that no corrosion spots could be observed in the corrosion test of the samples in example 1. From the above, it was concluded that recording and reproduction were improved, while corrosion resistance was dramatically improved by adding Al.

Examples 2 to 10

Magnetic recording medium was manufactured generally according to example 1 except that the composition of the soft magnetic layer was changed. Table 2 shows the results of evaluation.

istics started reducing, therefore, it was concluded that the upper limit of amount of addition of Al should preferably taken as 7 at. %.

Also, comparison of the example 1 and comparative examples 1, 2 in Table 1 shows that the saturation magnetic flux density improves by including Fe in CoFeZrNb-based alloy. However, according to the example 6 of Table 2, corrosion spots appear in samples containing Fe of 50 at. %. From the above, it was concluded that Fe must be included to improve the saturation magnetic flux density in this system, but if the Fe content is excessive, even if Al has been added, corrosion spots start appearing. Therefore, even in CoFeZrNb-based alloys in which Al has been added, the Fe content should preferably be below 50 at. %.

Examples 11, 12, 13

Magnetic recording medium was manufactured generally according to example 1 except that the thickness of the soft magnetic underlayer was changed. Table 3 shows the results of evaluation.

TABLE 2

| | Soft magnetic layer | | | Under layer | | Intermediate layer | | Static Magnetic Char. | Rec./Rep. | Corr. Spot |
|---|---|---|---|---|---|---|---|---|---|---|
| | Comp. (at %) | Bs (T) | Thk. (nm) | Comp. (at %) | Thk. (nm) | Comp. (at %) | Thk. (nm) | Coercivity (Oe) | Char. SNR (dB) | (per surface) |
| Example 1 | 70Co—20Fe—2Al—4Zr—4Nb | 1.62 | 30 + 30 | 100Ni | 5 | 100Ru | 12 | 4720 | 24.8 | 0 |
| Example 2 | 71.7Co—20Fe—0.3Al—4Zr—4Nb | 1.68 | 30 + 30 | 100Ni | 5 | 100Ru | 12 | 4660 | 24.2 | 4 |
| Example 3 | 69Co—20Fe—3Al—4Zr—4Nb | 1.61 | 30 + 30 | 100Ni | 5 | 100Ru | 12 | 4690 | 24.9 | 0 |
| Example 4 | 65Co—20Fe—7Al—4Zr—4Nb | 1.43 | 30 + 30 | 100Ni | 5 | 100Ru | 12 | 4750 | 24.3 | 0 |
| Example 5 | 90Co—2Al—4Zr—4Nb | 1.22 | 30 + 30 | 100Ni | 5 | 100Ru | 12 | 4660 | 24.6 | 0 |
| Example 6 | 40Co—50Fe—2Al—4Zr—4Nb | 1.82 | 30 + 30 | 100Ni | 5 | 100Ru | 12 | 4710 | 24.4 | 3 |
| Example 7 | 70Co—20Fe—2Al—3Ta—5Zr | 1.59 | 30 + 30 | 100Ni | 5 | 100Ru | 12 | 4730 | 24.7 | 1 |
| Example 8 | 70Co—20Fe—2Al—3Hf—5Nb | 1.57 | 30 + 30 | 100Ni | 5 | 100Ru | 12 | 4640 | 24.7 | 0 |
| Example 9 | 67Co—20Fe—2Al—4Zr—4Nb—3Ni | 1.61 | 30 + 30 | 100Ni | 5 | 100Ru | 12 | 4730 | 24.8 | 0 |
| Example 10 | 67Co—20Fe—2Al—4Zr—4Nb—1Cr | 1.58 | 30 + 30 | 100Ni | 5 | 100Ru | 12 | 4690 | 24.7 | 0 |

For all samples of different composition in the examples shown in Table 2, excellent characteristics could be obtained.

The sample in example 2 shown in Table 2 had 0.3 at. % of Al, and a small number of corrosion spots occurred in the sample. In contrast, in samples containing Al of 2 at. %, 3 at. %, and 7 at. %, no corrosion spots occurred. Moreover, as

TABLE 3

| | Soft magnetic layer | | | Under layer | | Intermediate layer | | Static Magnetic Char. | Rec./Rep. | |
|---|---|---|---|---|---|---|---|---|---|---|
| | Comp. (at %) | Bs (T) | Thk. (nm) | Comp. (at %) | Thk. (nm) | Comp. (at %) | Thk. (nm) | Coercivity (Oe) | Char. SNR (dB) | Corr. Spot (per surface) |
| Example 1 | 70Co—20Fe—2Al—4Zr—4Nb | 1.62 | 30 + 30 | 100Ni | 5 | 100Ru | 12 | 4720 | 24.8 | 0 |
| Example 11 | 70Co—20Fe—2Al—4Zr—4Nb | 1.61 | 10 + 10 | 100Ni | 5 | 100Ru | 12 | 4450 | 24.4 | 0 |
| Example 12 | 70Co—20Fe—2Al—4Zr—4Nb | 1.66 | 40 + 40 | 100Ni | 5 | 100Ru | 12 | 4810 | 24.8 | 1 |
| Example 13 | 70Co—20Fe—2Al—4Zr—4Nb | 1.59 | 7.5 + 7.5 | 100Ni | 5 | 100Ru | 12 | 4330 | 23.9 | 0 | observed in the comparative example 2 of Table 1, corrosion spots over a wide range were generated in samples not containing Al. Thus, it was verified that corrosion resistance is enhanced by adding Al to the CoFeZrNb system. However, comparing the samples of example 4 to which Al of 7 at. % was added to the samples of example 3 to which Al of 3 at. % was added, the SNR of recording and reproducing character- From the results shown in Table 3, it was observed that excellent characteristics were obtained in all samples of the example in which the thickness of the soft magnetic underlayer was greater than 20 nm. The coercivity of samples in example 13 in which the thickness of the soft magnetic underlayer was 15 nm, was slightly reduced, and SNR too was slightly lower.

Examples 14-31

Magnetic recording medium was manufactured generally according to example 1 except that the thickness and material of the under layer were changed. Table 4 shows the results of evaluation.

From the results of Table 5, it was concluded that excellent characteristics can be obtained in samples using CoFe-AlZrNb, CoFeHfTaAl as the material of the intermediate layer. Excellent characteristics were obtained in all samples in which the thickness of the intermediate layer was in the range of 8 to 25 nm. That is, the coercivity was high, and the SNR characteristics and corrosion resistance were found to be excellent.

TABLE 4

| | Soft magnetic layer | | | Under layer | | Intermediate layer | | Static Magnetic Char. | Rec./Rep. | |
|---|---|---|---|---|---|---|---|---|---|---|
| | Comp. (at %) | Bs (T) | Thk. (nm) | Comp. (at %) | Thk. (nm) | Comp. (at %) | Thk. (nm) | Coercivity (Oe) | Char. SNR (dB) | Corr. Spot (per surface) |
| Example 1 | 70Co—20Fe—2Al—4Zr—4Nb | 1.62 | 30 + 30 | 100Ni | 5 | 100Ru | 12 | 4720 | 24.8 | 0 |
| Example 14 | 69Co—20Fe—5Hf—4Ta—2Al | 1.62 | 30 + 30 | 95Ni—5Ru | 5 | 100Ru | 12 | 4790 | 24.7 | 1 |
| Example 15 | 69Co—20Fe—5Hf—4Ta—2Al | 1.62 | 30 + 30 | 95Ni—5Pt | 5 | 100Ru | 12 | 4880 | 25 | 0 |
| Example 16 | 69Co—20Fe—5Hf—4Ta—2Al | 1.62 | 30 + 30 | 95Ni—5W | 5 | 100Ru | 12 | 4920 | 25.1 | 0 |
| Example 17 | 69Co—20Fe—5Hf—4Ta—2Al | 1.62 | 30 + 30 | 95Ni—5Mo | 5 | 100Ru | 12 | 4980 | 25 | 0 |
| Example 18 | 69Co—20Fe—5Hf—4Ta—2Al | 1.62 | 30 + 30 | 95Ni—5Ta | 5 | 100Ru | 12 | 4600 | 24.9 | 0 |
| Example 19 | 69Co—20Fe—5Hf—4Ta—2Al | 1.62 | 30 + 30 | 95Ni—5Nb | 5 | 100Ru | 12 | 4520 | 25.2 | 0 |
| Example 20 | 69Co—20Fe—5Hf—4Ta—2Al | 1.62 | 30 + 30 | 95Ni—5Ti | 5 | 100Ru | 12 | 4780 | 25.1 | 0 |
| Example 21 | 69Co—20Fe—5Hf—4Ta—2Al | 1.62 | 30 + 30 | 93Ni—5Ru—2B | 5 | 100Ru | 12 | 4640 | 24.9 | 1 |
| Example 22 | 69Co—20Fe—5Hf—4Ta—2Al | 1.62 | 30 + 30 | 90Ni—4Pt—6B | 5 | 100Ru | 12 | 4550 | 24.8 | 0 |
| Example 23 | 69Co—20Fe—5Hf—4Ta—2Al | 1.62 | 30 + 30 | 86Ni—4Pt—10B | 5 | 100Ru | 12 | 4510 | 24.1 | 0 |
| Example 24 | 69Co—20Fe—5Hf—4Ta—2Al | 1.62 | 30 + 30 | 93Ni—5W—2Mn | 5 | 100Ru | 12 | 4820 | 25.4 | 0 |
| Example 25 | 69Co—20Fe—5Hf—4Ta—2Al | 1.62 | 30 + 30 | 90Ni—4Ta—6Mn | 5 | 100Ru | 12 | 4550 | 24.9 | 0 |
| Example 26 | 69Co—20Fe—5Hf—4Ta—2Al | 1.62 | 30 + 30 | 86Ni—4Ta—10Mn | 5 | 100Ru | 12 | 4470 | 24.1 | 1 |
| Example 27 | 69Co—20Fe—5Hf—4Ta—2Al | 1.62 | 30 + 30 | 80Ni—20Fe | 5 | 100Ru | 12 | 4620 | 24.6 | 0 |
| Example 28 | 69Co—20Fe—5Hf—4Ta—2Al | 1.62 | 30 + 30 | 80Ni—20Co | 5 | 100Ru | 12 | 4610 | 24.9 | 1 |
| Example 29 | 69Co—20Fe—5Hf—4Ta—2Al | 1.62 | 30 + 30 | 100Ni | 1 | 100Ru | 12 | 4250 | 24.1 | 0 |
| Example 30 | 69Co—20Fe—5Hf—4Ta—2Al | 1.62 | 30 + 30 | 100Ni | 10 | 100Ru | 12 | 4900 | 24.2 | 1 |
| Example 31 | 69Co—20Fe—5Hf—4Ta—2Al | 1.62 | 30 + 30 | 100Ni | 15 | 100Ru | 12 | 4890 | 23.8 | 0 |

From the results of Table 4, it was verified that particularly excellent characteristics were obtained when Ni, Ni alloy, NiFe alloy, or NiCo alloy was used in under layer of the examples. That is, the coercivity was high, and the SNR characteristics and corrosion resistance were found to be excellent.

Examples 32-41

Magnetic recording medium was manufactured generally according to example 1 except that the material and thickness of the intermediate layer were changed. Table 5 shows the results of evaluation.

Example 42

Magnetic recording medium was manufactured generally according to example 2 except that the 60Nb-40Cr layer of thickness 8 nm having an amorphous structure was formed between the non-magnetic substrate and the soft magnetic underlayer as a barrier layer. As the static magnetic charac-

TABLE 5

| | Soft magnetic layer | | | Under layer | | Intermediate layer | | Static Magnetic Char. | Rec./Rep. | |
|---|---|---|---|---|---|---|---|---|---|---|
| | Comp. (at %) | Bs (T) | Thk. (nm) | Comp. (at %) | Thk. (nm) | Comp. (at %) | Thk. (nm) | Coercivity (Oe) | Char. SNR (dB) | Corr. Spot (per surface) |
| Example 1 | 70Co—20Fe—2Al—4Zr—4Nb | 1.62 | 30 + 30 | 100Ni | 5 | 100Ru | 12 | 4720 | 24.8 | 0 |
| Example 32 | 69Co—20Fe—5Hf—4Ta—2Al | 1.62 | 30 + 30 | 100Ni | 5 | 100Ru | 10 | 4570 | 24.7 | 1 |
| Example 33 | 69Co—20Fe—5Hf—4Ta—2Al | 1.62 | 30 + 30 | 100Ni | 5 | 100Ru | 8 | 4490 | 24.6 | 0 |
| Example 34 | 69Co—20Fe—5Hf—4Ta—2Al | 1.62 | 30 + 30 | 100Ni | 5 | 100Ru | 14 | 4820 | 24.6 | 0 |
| Example 35 | 69Co—20Fe—5Hf—4Ta—2Al | 1.62 | 30 + 30 | 100Ni | 5 | 100Ru | 16 | 4880 | 24.8 | 0 |
| Example 36 | 69Co—20Fe—5Hf—4Ta—2Al | 1.62 | 30 + 30 | 100Ni | 5 | 100Ru | 25 | 4940 | 24.2 | 0 |
| Example 37 | 69Co—20Fe—5Hf—4Ta—2Al | 1.62 | 30 + 30 | 100Ni | 5 | 80Ru—20Co | 12 | 4770 | 25.1 | 0 |
| Example 38 | 69Co—20Fe—5Hf—4Ta—2Al | 1.62 | 30 + 30 | 100Ni | 5 | 90Ru—10Cr | 12 | 4720 | 24.9 | 1 |
| Example 39 | 69Co—20Fe—5Hf—4Ta—2Al | 1.62 | 30 + 30 | 100Ni | 5 | 80Ru—20Mn | 12 | 4590 | 25.1 | 0 |
| Example 40 | 69Co—20Fe—5Hf—4Ta—2Al | 1.62 | 30 + 30 | 100Ni | 5 | 80Ru—20Al | 12 | 4560 | 25.2 | 0 |
| Example 41 | 69Co—20Fe—5Hf—4Ta—2Al | 1.62 | 30 + 30 | 100Ni | 5 | 80Ru—20Mo | 12 | 4750 | 24.8 | 0 | teristics, the coercivity of the magnetic recording media is 4630 Oe, the SNR characteristics is 24.2 dB, the corrosion spot (per surface) was 0.

INDUSTRIAL APPLICABILITY

As mentioned above, according to the present invention, the perpendicular magnetic recording medium comprises at least a soft magnetic underlayer and under layer and intermediate layer and perpendicular magnetic recording layer on non-magnetic substrate, wherein the soft magnetic underlayer formed by soft magnetic layer with saturation magnetic flux density Bs greater than 1.1 T is made of CoAl alloy, and the under layer is formed either by Ni, Ni alloy, NiFe alloy, or NiCo alloy. Therefore, magnetic recording medium and magnetic recording and reproducing device capable of recording and reproducing high density information with excellent productivity can be offered.

The invention claimed is:

1. A perpendicular magnetic recording medium comprising;
    a non-magnetic substrate; and
    a soft magnetic underlayer, an under layer, an intermediate layer and a perpendicular magnetic recording layer, on the non-magnetic substrate,
    wherein the soft magnetic underlayer comprises a soft magnetic layer which has an amorphous structure and is made of CoFeAl alloy with a saturation magnetic flux density Bs greater than 1.4 T,
    at least one of Ta, Nb or Zr is also included as content in the soft magnetic layer; and
    the Al content of the soft magnetic layer is greater than 0.2 at % but less than 7 at %.

2. A magnetic recording medium according to claim 1, wherein the Al content of the soft magnetic layer is greater than 0.3 at. % but less than 3 at. %.

3. A magnetic recording medium according to claim 1, wherein the Fe content of the soft magnetic layer is less than 50 at. %.

4. A magnetic recording medium according to claim 1, wherein either Ni or Cr is also included as content in the soft magnetic layer.

5. A magnetic recording medium according to claim 1, wherein the soft magnetic underlayer comprises two layers of AFC (Anti-Ferro-Coupling) structure and Ru film formed between these two layers of soft magnetic layer.

6. A magnetic recording medium according to claim 1, wherein Ms·t (T·nm), the product of saturation magnetic flux density and film thickness of the soft magnetic underlayer is greater than 3 but less than 8.

7. A magnetic recording medium according to claim 1, wherein the under layer material is either Ni, Ni alloy, NiFe alloy or NiCo alloy, and the intermediate layer provided thereupon is an Ru alloy having a $\Delta\theta 50$ of less than 6 degrees.

8. A magnetic recording medium according to claim 1 wherein the intermediate layer is made of Ru or Ru alloy.

9. A magnetic recording medium according to claim 1 wherein the film thickness of the soft magnetic underlayer is greater than 20 nm but less than 80 nm.

10. A magnetic recording medium according to claim 1 wherein the thickness of the intermediate layer is less than 16 nm.

11. A magnetic recording medium according to claim 1 wherein the soft magnetic layer is either CoFeAlZrNb, CoFeAlHfNb, CoFeAlTaNb, CoFeAlZrNbCr, or CoFeAlZrNbNi.

12. A magnetic recording medium according to claim 1, further comprising a barrier layer between the non-magnetic substrate and the soft magnetic underlayer.

13. A magnetic recording medium according to claim 12, wherein the barrier layer comprises a main element selected from the group consisting of elements included by the soft magnetic underlayer except for Co and Fe
    wherein the elements included in the soft magnetic underlayer are other than Co and Fe are at least one of Al, Ni, Ta, Nb, Zr, Hf, and Cr.

14. A magnetic recording medium according to claim 12, wherein the barrier layer has an amorphous structure.

15. A magnetic recording medium according to claim 12, wherein the film thickness of the barrier layer is greater than 1 nm but less than 20 nm.

16. A magnetic recording and reproducing device of the present invention comprising magnetic recording medium and magnetic head for recording and reproducing information on the magnetic recording medium, wherein the magnetic head is a single magnetic pole head, and the magnetic recording medium is the magnetic recording medium according to claim 1.

* * * * *